United States Patent [19]
Williams

[11] Patent Number: 5,274,472
[45] Date of Patent: Dec. 28, 1993

[54] HIGH ADDRESSABILITY IMAGE GENERATOR USING PSEUDO INTERPOLATION OF VIDEO AND SCREEN DATA

[75] Inventor: Leon C. Williams, Walworth, N.Y.

[73] Assignee: Xerox Corporation, Stamford, Conn.

[21] Appl. No.: 887,972

[22] Filed: May 21, 1992

[51] Int. Cl.$^5$ .............................................. H04N 1/40
[52] U.S. Cl. ................................... 358/455; 358/518; 358/429; 358/456
[58] Field of Search ............... 358/455, 22, 87, 21 R, 358/149, 11, 13, 140, 133, 137, 182, 160, 183, 298, 456, 166, 452, 78, 135, 104, 75, 80, 432, 283; 364/413.16, 413.18, 723, 724, 725, 521, 413.13; 395/141, 116, 126, 121, 133; 340/744, 750, 703, 798, 793, 723, 728

[56] References Cited

U.S. PATENT DOCUMENTS

| | | | |
|---|---|---|---|
| 4,251,837 | 2/1981 | Janeway, III | 358/280 |
| 4,553,173 | 11/1985 | Kawamura | 358/283 |
| 4,743,970 | 5/1988 | Barnett et al. | 358/183 |
| 4,847,695 | 7/1989 | Arai | 358/455 |
| 4,926,248 | 5/1990 | Kobayashi et al. | 358/75 |
| 4,959,730 | 9/1990 | Tai et al. | 358/298 |
| 4,984,097 | 1/1991 | Shu | 358/429 |
| 4,984,157 | 1/1991 | Cline et al. | 364/413.13 |
| 4,999,718 | 3/1991 | Arai | 358/455 |
| 5,045,952 | 9/1991 | Eschbach | 358/447 |
| 5,054,100 | 10/1991 | Tai | 382/47 |
| 5,149,960 | 9/1992 | Dunne et al. | 250/226 |
| 5,187,594 | 2/1993 | Deutsch et al. | 358/455 |
| 5,237,400 | 8/1993 | Washio et al. | 358/518 |

FOREIGN PATENT DOCUMENTS

58-139282  8/1983  Japan .

*Primary Examiner*—Paul Ip
*Attorney, Agent, or Firm*—Thomas B. Zell

[57] ABSTRACT

There is provided a method to convert gray level image data from image input terminals, into binary data for high-addressability image output terminals. High addressability output terminals such as printers increase their virtual resolution in the fast scan direction in order to achieve a higher effective printing resolution. For example, one pixel in the slow scan direction divided into eight pixels in the fast scan direction, improves a printer's actual resolution from n spots×m spots per unit area to (8 * n) spots×m spots per unit area. Gray level input data representing pixel data from image input terminals such as scanners is encoded by either an analog signal or a quantized digital signal with a large number of levels (e.g. 256 levels). Binary output data has pixels with either a value of one or zero or a much smaller number of gray levels compared to digital input signals.

7 Claims, 3 Drawing Sheets

HIGH ADDRESSABILITY IMAGE GENERATOR USING PSEUDO INTERPOLATION OF VIDEO AND SCREEN DATA

BACKGROUND OF THE INVENTION

1. Field of the Invention

The present invention relates to digital image processing, and in particular to a method for generating high addressability binary images from gray video image data.

2. Description of Prior Art

Digital reproduction, transfer or display of original images on image output terminals begins by creating a digital representation of an original image. Commonly, the digital representation becomes a two-tone microstructure otherwise known as a bitmap. In such representations, multiple gray levels or gray densities in the original image are reproduced by varying the spatial frequency of halftone microstructures (or halftone cells/dots). Continuous tone images or image portions are typically represented in binary format by creating halftone cells or dots, where each cell represents a gray level density within an area of picture elements (pixels).

Methods of halftone digital image processing, encompassing the process steps of scanning or image acquisition through printing or display are known. In general, digital image output terminals (e.g. printers) are capable of creating spots within an area with a predetermined resolution (dots per unit area). in scanners, a single "spot" describes a multi-bit density response. Typically, input scanners may acquire density information at 256 levels of gray to describe a spot or pixel. By contrast, output terminals generally have two or another relatively small number of levels to reproduce image information. Output terminals commonly contend with excess scanned information by quantizing the image data through halftoning techniques, to represent the image as a halftone.

A continuing goal in the art is to develop output terminals such as printers with improved image quality. Physical constraints such as output terminal device resolution (spots per unit area) can be enhanced so as to increase perceived resolution without resorting to physical device resolution increases. Current technology improves device resolution without actually increasing dots per unit area. There are many advantages to increasing or controlling a printer's virtual (enhanced) resolution. The most evident advantage is a compatibility issue. Many printers have a physical resolution (or addressability) of 300 dots per inch (dpi), and by creating printers with greater physical resolutions such as 400 dpi, image emitters or document creators producing resolution dependent images at a particular resolution are no longer compatible. A solution to this problem is found by using device independent document (or image) descriptions such as Xerox Interpress and PostScript page description languages. Currently, however, other PDLs such as Adobe Hewlett Packard HP-PCL are not resolution independent.

A further limitation of higher resolution devices is hardware affordability. Physical memory requirements increases when device resolution increases, directly increasing the cost of a physical device. As a result of increased memory requirements for higher resolution devices, technology enhancing physical device resolution limitations (virtual resolution) are desirable additions to the physical device.

High addressability techniques use laser modulation or pulse width modulation to increase printer resolution without modifying the physical printer device. Laser modulation uses a controller to modulate the appearance of the final output image. Printed spots of the output image may be moved, shrunk, or reshaped to achieve a variety of effects. High addressability methods affect the horizontal resolution. For example, doubling printer modulation rate results in doubling the horizontal resolution, while keeping vertical resolution unchanged. New and improved techniques to increase image resolution have improved halftone image quality. Specifically in the field of digital halftoning different methods of converting continuous tone to binary images while preserving the appearance of tonal gradation or density similar to the original image have been disclosed.

Kawamura U.S. Pat. No. 4,553,173 relates to an apparatus for displaying halftone images with a high resolution and a high gradation. Tai et al. U.S. Pat. No. 4,959,730 relates to apparatus which suppresses false density contours caused by an insufficient number of output gray levels in a reproduction system. Eschbach U.S. Pat. No. 5,045,952, describes improving image quality by dynamically adjusting the threshold of an error diffusion algorithm in accordance with the input image to selectively control the amount of edge enhancement introduced into a binary encoded output. Janeway U.S. Pat. No. 4,251,837, describes a method and apparatus for mode selection in a three decision thresholding mode switch to control copying of mixed format documents. Japanese Patent No. 58-139282 to Tanimoto describes a system to detect a picture position with high resolution by finding an intersection position between a threshold and a video signal from a strait interpolation corresponding to the counted result of a transfer clock between pixels putting adjacent thresholds between them.

Methods for converting a digital image signal into an analog image signal, where the analog image signal is compared to a periodic analog pattern signal such as a triangle wave signal to produce a pulse-width modulated image signal, includes Kobayashi U.S. Pat. No. 4,926,248 which describes a method for improving the image quality in an image recording apparatus, and for varying the recording area of each pixel in order to express light and shade of the image. Aral U.S. Pat. No. 4,847,695 describes an apparatus in which the minimum and maximum widths of a pulse-width modulated signal can be independently adjusted in accordance with predetermined data signals. Arai U.S. Pat. No. 4,999,718 describes an apparatus with interference suppression, in which a pattern selection signal is used in accordance with a halftone area or line image on a document to inhibit the output of a non-selected pattern so that a noise component due to mutual interference is eliminated. A pulse-width modulated signal which is in linear relation with the image signal is produced.

Image quality problems continue to exist with pulse-width modulation systems, including the generation of artifacts giving fuzzy characters and lines, as well as xerographic stability problems which are a result of inconsistent toner output distribution from one output image to the next. FIG. 4 and graphs A, B, C and D therein, provide an example of a pulse-width modulation scheme. Graph A shows a series of pixel clock pulses providing input pixel width. Graph B shows a video input signal such as might be derived from an input scanning device. Graph C shows a periodic triangular pulse width modulation function. Modulating input signal B with periodic triangular signal C produces a modulated output signal shown in Graph D of FIG. 4.

Fuzzy characters or lines using pulse width modulation are caused by aliasing or high frequency overlapping of successive periods. One method of overcoming fuzzy characters using pulse width modulation functions is to use two modulation functions with different frequencies. For example, one modulation function (one pixel width) is at a higher frequency than another (two pixel width). By increasing the modulation function when image spatial frequency increases, sharp contrasts between lines and text are preserved. A decrease in frequency modulation during areas of low spatial frequency, enables varying shades of gray to be generated.

In xerographic laser printers, stability problems caused by variances in a xerographic process place less toner on pixel edges due to xerographic threshold movement. The xerographic threshold is the effective level to which a charged photoreceptor surface exposed to a laser is discharged. In other words the threshold represents the level at which a surface is considered to be black or white (or more generically, one color or another for color separations). if the threshold is unstable between two identical copies, there exists a variance in overall color (or toner) distribution.

Another method of increasing virtual device resolution is through resolution enhancement, which takes place prior to creating output image spots. Resolution enhancement only uses pattern recognition technique over an n spot×m spot region about a pixel being processed to look for specific problems that may be corrected by either moving the spot left or right, changing the spot size or adding spots. Image quality problems addressed by the resolution enhancement technique include reduced jaggies (or stair-stepping) on or near vertical or horizontal lines, blunted serifs (fine decorative lines added to a typeface) and toner pooling at line intersections, as shown in PCL 5 and The Laser Jet III: Hewlett-Packard Sets Standards for the 1990's by Charles LeCompte (BIS CAP International, 1990). As with other virtual device resolution improvements techniques, resolution enhancement increases perceived resolution.

SUMMARY OF THE INVENTION

In accordance with the invention, there is provided a method to convert gray level image data from image input terminals, into binary data for high-addressability image output terminals. High addressability output terminals such as printers increase their virtual resolution in the fast scan direction in order to achieve a higher effective printing resolution. For example, one pixel in the slow scan direction divided into eight pixels in the fast scan direction, improves a printer's actual resolution from n spots×m spots per unit area to (8 * n) spots×m spots per unit area. Gray level input data representing pixel data from image input terminals such as scanners is encoded by either an analog signal or a quantized digital signal with a large number of levels (e.g. 256 levels). Binary output data has pixels with either a value of one or zero or a much smaller number of gray levels compared to digital input signals.

There is further provided a gray video input signal, in which gray image pixels and pixel screens are embedded. Each pixel screen identifies a screen for each input pixel in the gray video input data. A pixel interpreter is used to distinguish image pixels from gray video input data, and a screen function generator is used to generate a screen associated with an image pixel from the gray video input data. A screen is a fixed controllable threshold. Screens are fixed between input pixel boundaries but controllable from one pixel boundary to another. Pixel screens retain qualities distinguishing the content of original scanned input images. Original images may be composed entirely of lines, low frequency halftones, high frequency halftones, continuous tones or a combination thereof. The screen used in determining each output pixel, is an important parameter which aids in preserving the image quality of an input image. Once the image pixel and pixel screen are determined, they are stored.

In accordance with the invention, once an image pixel and screen are developed along with a previously stored image pixel and screen, there is provided an interpolator, which interpolates four values and produces a result. The interpolator takes as input the current image pixel and screen developed along with the previously stored image pixel and screen. The interpolator generates two lines from the input. One line Is formed using the stored screen and current screen values. A second line Is formed using the stored pixel and current pixel values. A value for the intersection of both lines is determined by the interpolator. Once a value for the intersection is realized, a comparator takes as input the value for the intersection as well as the stored screen and pixel values.

In accordance with the invention there is further provided a comparator to evaluate input in order to generate high addressability output pixels. The comparator uses three values, the stored screen and pixel values, as well as the output from the interpolator, to identify each high addressability output pixel between the stored pixel and the currently developed pixel.

An advantage of the inventive method is increased resolution of a halftone cell in the fast scan direction by any factor. Consequently aliasing of text and lines due to sampling is reduced, since actual area as opposed to average area of an image is exposed. The invention also increases binary output resolution for high addressability output devices. A further advantage of the inventive method is its use in data compression schemes. Since the method is not tied to an input or output device (i.e. input and output device independent), the method can be used as a compressor and decompressor of high addressability data.

In summary, the inventive method transforms gray video input information using an interpolation function into a binary high addressability output representation for later manipulation on binary high addressability output terminals such as printers and displays. Using an interpolator, a value at the Intersection between video and screen input pixel information is determined. Based on the value of the interpolation at the intersection and the screen and video data, a high addressability output image pixel value is determined. Thus for any signal with both video and screen input pixel information, output pixel information is generated with any number of high addressability pixels between any two consecutive input pixels.

Other features of the present invention will become apparent as the following description proceeds and upon reference to the drawings.

DESCRIPTION OF THE EMBODIMENT

Image data in the form of video image data picture elements (pixels), which may be either analog or digital voltage representations of an image, is provided from a suitable source. For example, pixels may be obtained through a line by line scanning of an image bearing original by one or more photosensitive elements, such as a multiple photosite array of a charged coupled device, commonly referred to as CCD's or generated through a computer graphics software package, or as a result of a mapping of binary pixels at a first resolution to pixels at a second resolution. Line by line scanning of an image bearing original for the derivation of image data is well known and does not form a part of the present invention.

Figure 1:
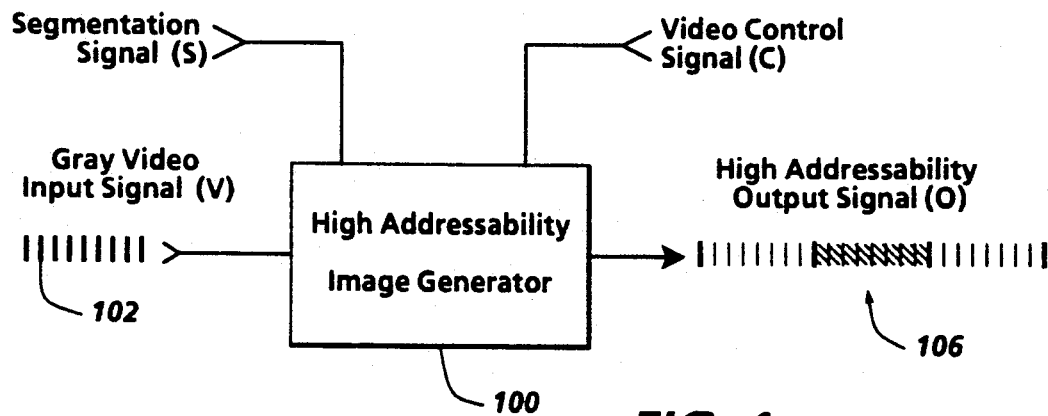
FIG. 1 shows system level overview of a high addressability image generator wherein the invention lies.

For a general understanding of the features of the present invention, references are made to the drawings, where the showings are for the purpose of describing an embodiment of the invention and not for limiting same. With reference now to FIG. 1 showing a system level overview of the invention, high addressability image generator 100, controlled by a video control signal (C) while taking as input a gray video input signal (V) and a segmentation signal (S), generates a high addressability binary output signal (0). FIG. 1 also shows the resulting change of image data from input to output. Given a stream of input pixels, one multi-bit input pixel 102 corresponds to eight high addressability output pixels 106. In other words, high addressability output pixels increases input pixel resolution in one dimension (typically in the fast scan direction). Note that the number of high addressability pixels providing increased virtual resolution of the input signal is not limited to eight, and may be any number of high addressability pixels.

Figure 2:
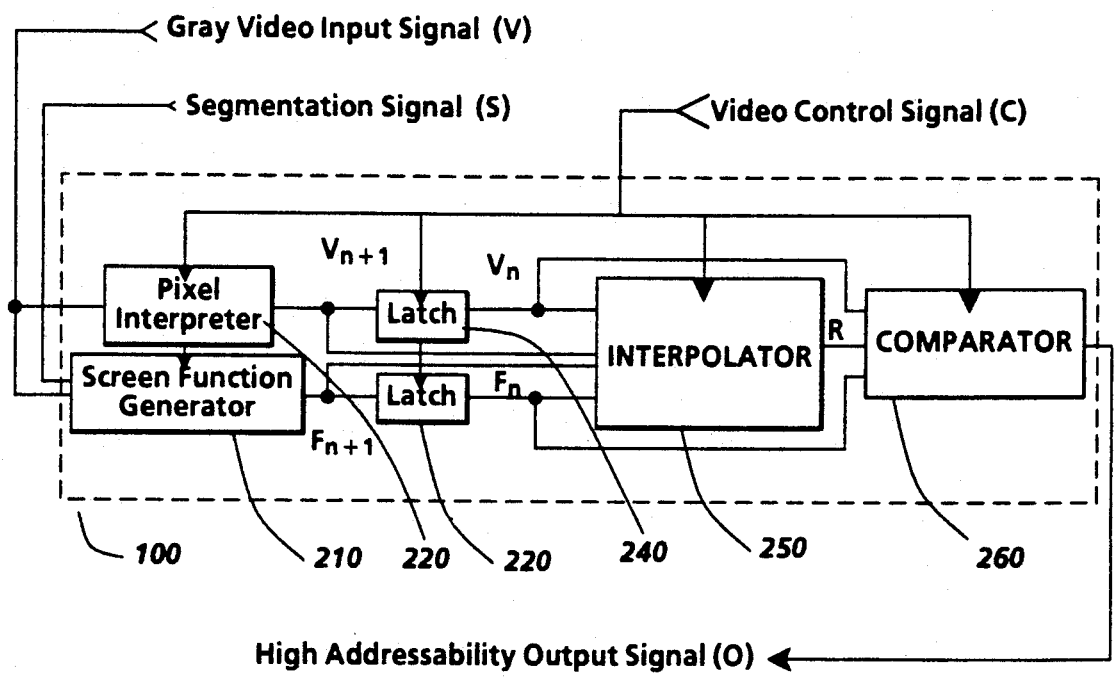
FIG. 2 is a block diagram of the high addressability generator shown in FIG. 1.

A more detailed view of high addressability image generator 100 is shown in FIG. 2. Inputs to the system are gray video input information (V), segmentation signal (S) and a video control signal (C). Gray video input signal (V) is input to screen function generator 210 and pixel interpreter 220. Embedded in the gray video input signal are image pixels and pixel screens. Pixel interpreter 220 distinguishes image pixel $V_{n+1}$ from gray video input signal (V). Screen function generator 210 receives as input, segmentation signal (S) and gray video input signal (V), in order to generate an appropriate screen function $F_{n+1}$ corresponding to image pixel $V_{n+1}$.

Once generated by screen function generator 210 and pixel interpreter 220, signals $F_{n+1}$ and $V_{n+1}$ are latched in memory latches 230 and 240 respectively in order to generate signals $V_n$ and $F_n$. Interpolator 250 takes as Inputs image pixel density information $V_n$ and $V_{n+1}$ and screen information $F_n$ and $F_{n+1}$, and interpolates the input information to generate output ratio R. Output ratio R, image pixel density information $V_n$ and screen information $F_n$ are inputs to comparator 260, which determines high addressability output pixels for corresponding input pixel $V_n$. Elements 210 through 260 are synchronized by video control signal (C).

Examining now each element in high addressability image generator 100 in detail, segmentation signal (S) which is an input to screen function generator 210 provides information about gray video input signal (V). The information reveals whether there is a presence of halftones in the input signal (V). Input signal (V) may be composed entirely of lines, or low frequency halftone images, or high frequency halftone images, or continuous tone images, or combinations thereof. A method of segmentation is taught by U.S. patent application Ser. No. 07/722,568, entitled "Improved Automatic Image Segmentation" by Shiau et al., assigned to the same assignee as the present invention and is incorporated herein by reference. Segmentation signal (S) combined with video signal (V) enable screen function generator 210 to determine a screen which produces an output image with desired image quality.

Interpolator 250 evaluates the following equation based on inputs $V_n$, $V_{n+1}$, $F_n$ and $F_{n+1}$ to determine output R.

$$R = (F_n - V_n)/[(V_{n+1} - V_n) - (F_{n+1} - F_n)] \qquad [1]$$

where
$V_n$ a first input pixel density value
$V_{n+1}$ = a second input pixel density value
$F_n$ = a first screen or threshold valve of $V_n$
$F_{n+1}$ = a second screen or threshold valve of $V_n$
n = an nth pixel a in bit stream
R = an interpolated signal
Given eight high addressability pixels in the embodiment, ratio R is calculated to a 3 bit value. A method of three bit division may be implemented in hardware using gated successive subtractions to determine the value of R. By comparing R with image pixel $V_n$ and screen $F_n$, values for high addressability pixels labeled one through seven are determined.

Figure 3A:
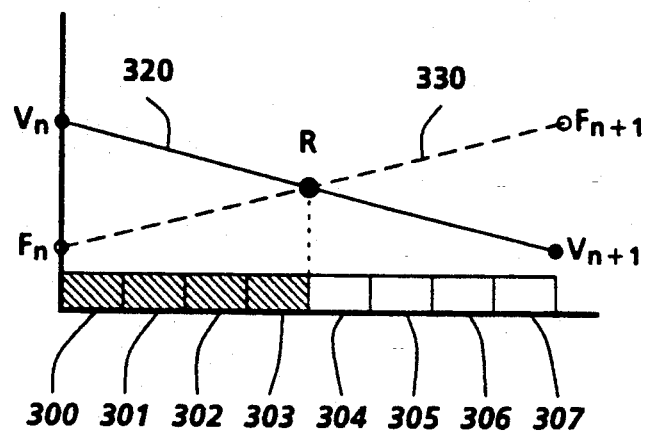
FIGS. 3A and 3B show graphically the interpolator in FIG. 2 for first and second screens and input pixels.
Figure 3B:
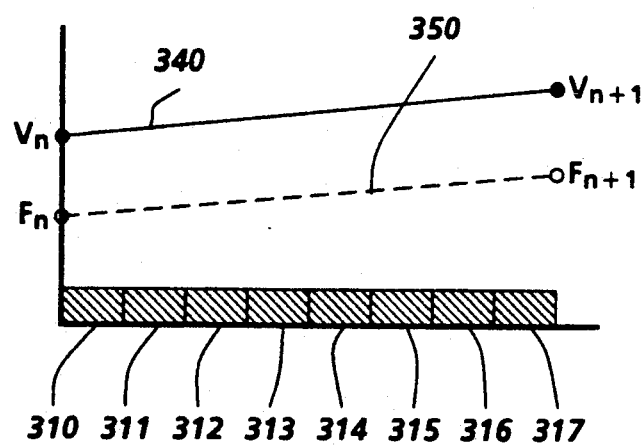
Figure 4:
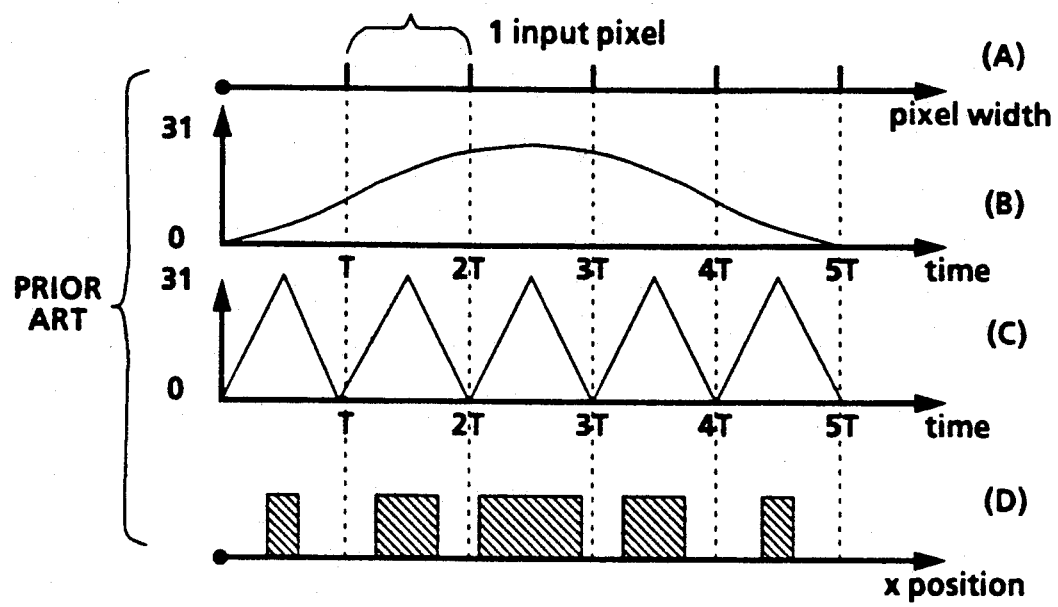
FIG. 4 (A-D) is a graphical diagram of prior art, 4A indicates the input pixel widths, 4B represents a video input signal; 4C represents a pulse width modulated signal, 4D represents the output of the input 4B modulated with the signal 4C.

An example of interpolation of two consecutive pixels $V_n$ and $V_{n+1}$ is shown with reference to FIG. 2 and FIG. 3A. A value R is determined from the intersection of pixel line 320 and screen line 330 by using equation [1]. High addressability output pixels 300 to 307 are determined by comparator 260 once values for interpolated signal R, image pixel $V_n$ and screen $F_n$ are inputted. Output pixels 300, 301, 302 and 303 are turned ON by the comparator 260, since $V_n$ is of greater value than $F_n$ in the interval from $V_n$ to $V_{n+1}$. Output pixels 304, 305, 306 and 307 on the other hand are turned OFF, since $V_n$ Is of less value than $F_n$ in the same interval. Since the intersection of pixel line 320 and screen line 330 is known, all high addressability bits between the two subsequent input pixels can be interpolated. If, however, pixel line 340 and screen line 350 should not intersect as shown in FIG. 3B, values for output pixels 310 through 317 take on the same value (ON or OFF) depending on the values Of $V_n$ and $F_n$. For the example shown in FIG. 3B, output pixels 310 through 317 are all turned ON since the pixel value $V_n$ is greater than screen value $F_n$. Although the high addressability pixel values take on binary values (ON or OFF) in this embodiment, the comparator however need not be in general limited so, and could have multiple bits representing output pixel values.

With reference now to FIGS. 5A-5C, FIG. 5A shows the high addressability of each output pixel in relation to each input pixel, where in this specific case each input pixel is divided into eight high addressability output pixels. FIG. 5B shows video input 510 and screen 512. Diagram 5C shows pixel output values resulting from interpolation between video input 510 and screen 512.

As an example, an interpolation between input pixels 500 and 502 is illustrated. Video 510 at points 520 and 522, and screen function 512 at points 530 and 532 are interpolated using interpolating function to [1] to determine interpolated value 540:

$$R(540)=(F_n(530)-V_n(520))/[(V_{n+1}(522)-V_n(520))-(F_{n+1}(532)-F_n(530))]$$

Once calculated, intersection 540 of video 510 and screen 512 between input pixels 500 and 502, is used to determine if high-addressability output pixels one through seven are turned ON over a series of high addressability output pixels. Each high-addressability output pixel value is turned ON or OFF based by comparing input pixel density and screen values 520 and 530 with interpolated value 540. Output pixel at positions 500 is determined by directly comparing input pixel density and screen values 520 and 530. In a special cases where lines 510 and 512 do not intersect, all high-addressability output pixel stake on a single density value given by solely comparing pixel density and screen values 520 and 530.

Figure 5:
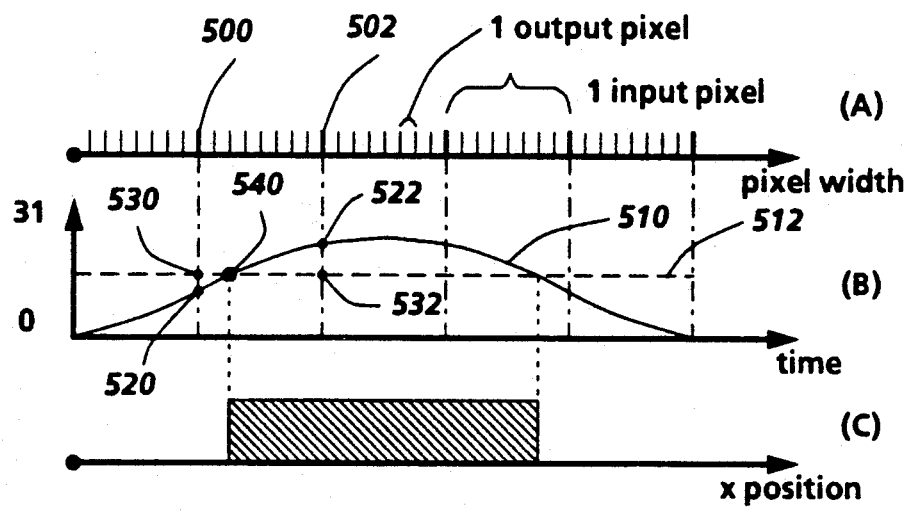
FIG. 5 (A-C) is a graphical diagram of the invention, where 5A represents high addressability output pixel widths along with input pixel widths, 5B represents video input and screen, 5C represents the output of the invention using video input and screen in 5B.

FIG. 5 further illustrates various advantages over the prior art that are realized by the invention. The invention uses screens that have fixed, but controllable thresholds. Screens values are fixed between input pixel boundaries, but controllable from one pixel boundary to another. Screens are not required to be periodic, as shown FIG. 5B. When periodic modulation functions are used for text or lines (elements with a high spatial frequency), instability problems result. Since frequency modulation of a modulation function is pixel bounded, modulation functions tend to approximate a continuous function when text or lines are present by modulating at a very high rate. Stability problems result when a printer's xerographic threshold becomes unstable because the printer's laser is modulated (turned ON or OFF) at a very high frequency. Output in FIG. 5C shows a very stable output function where a laser from a printer would be turned on and off only once over the interval shown. This contrasts with output shown in FIG. 5D that has five discontinuities over the same interval.

In summary, the invention interpolates two consecutive input pixels and screens over an interval in order to find an intersection between them. If no intersection is found, only values of the input pixel and screen interval being evaluated are used to determine high addressability output pixel density values. If, however, an Intersection is determined, the interpolated value as well as the input pixel density and screen values over the interval are used to determine values of the high addressability output pixels. The invention is capable of interpolating any number of high addressability output pixels for a given input pixel interval, effectively increasing the virtual resolution of any output terminal. Image quality of output images is improved also because interpolation reduces aliasing.

It is, therefore, apparent that there has been provided in accordance with the present Invention, a high addressability image generator using pseudo interpolation of video and screen data that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for generating high addressability image output signals for display or reproduction on image output terminals from an image input signal with a high addressability image generator having a screen function generator and a memory in which a first and a second input pixel density from the image input signal are stored, comprising the steps of:
   a) developing first and second screen signals from the image input signal using the screen function generator;
   b) determining an interpolated signal from said first and second screen signals and the stored values from first and second input pixel densities; and
   c) using said interpolated signal, said first screen signal and the first input pixel density to obtain high addressability output pixel densities for ultimate display or reproduction on an image output terminal.

2. The method as given in claim 1 wherein developing said first and second screen signals is made by designating a screen type from a plurality of screen types to best describe the image input signal.

3. The method in claim 2 wherein said screen type is characterized by a threshold value.

4. The method in claim 2 wherein said screen type is characterized by a halftone screen.

5. The method as given in claim 1 wherein the step of determining said interpolated signal is obtained using an interpolation function.

6. The method in claim 2 wherein said interpolation function is characterized by the equation:

$$R=(F_n-V_n)/[(V_{n+1}-V_n)-(F_{n+1}-F_n)] \qquad [1]$$

where
$V_n$ = a first input pixel density value
$V_{n+1}$ = a second input pixel density value
$F_n$ = a first screen or threshold valve of $V_n$
$F_{n+1}$ = a second screen or threshold valve of $V_n$
n = an nth pixel a in bit stream
R = an interpolated signal.

7. The method as given in claim 1 wherein the step of obtaining high addressability output pixel densities is accomplished using a comparator.

* * * * *